(12) United States Patent
Belzile et al.

(10) Patent No.: US 12,107,459 B2
(45) Date of Patent: Oct. 1, 2024

(54) ROTOR FOR AN ELECTRIC AIRCRAFT MOTOR COMPRISING A PLURALITY OF MAGNETS

(71) Applicant: BETA AIR, LLC, South Burlington, VT (US)

(72) Inventors: Manon Danielle Belzile, Fairfield, VT (US); Kyle B. Clark, Underhill, VT (US); Stephen Widdis, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 17/704,798

(22) Filed: Mar. 25, 2022

(65) Prior Publication Data

US 2023/0307972 A1    Sep. 28, 2023

(51) Int. Cl.
| | |
|---|---|
| *H02K 1/30* | (2006.01) |
| *B64C 29/00* | (2006.01) |
| *B64D 27/24* | (2024.01) |
| *B64D 33/08* | (2006.01) |
| *H02K 1/278* | (2022.01) |
| *H02K 9/06* | (2006.01) |
| *H02K 21/16* | (2006.01) |

(52) U.S. Cl.
CPC ............ *H02K 1/30* (2013.01); *B64D 27/24* (2013.01); *B64D 33/08* (2013.01); *H02K 1/278* (2013.01); *H02K 9/06* (2013.01); *H02K 21/16* (2013.01); *B64C 29/00* (2013.01)

(58) Field of Classification Search
CPC .... H02K 1/278; H02K 1/2781; H02K 1/2783; H02K 9/02; H02K 9/04; H02K 9/06; H02K 21/16; B64D 27/24; B64D 33/08
See application file for complete search history.

(56) References Cited

U.S. PATENT DOCUMENTS 1,420,774 A * 6/1922 Stainbrook ............. H02K 7/14
310/104
4,973,872 A   11/1990 Dohogne
(Continued)

FOREIGN PATENT DOCUMENTS

JP     2007205409 A  *  8/2007
KR     101202476 B1  * 11/2012
(Continued)

OTHER PUBLICATIONS

Oezcan et al., WO2022017721 Machine Translation, Jan. 2022 (Year: 2022).*
(Continued)

*Primary Examiner* — Eric Johnson
(74) *Attorney, Agent, or Firm* — Brake Hughes Bellermann LLP

(57) ABSTRACT

A rotor for a motor of an electric aircraft is provided. The rotor may include a hub, which includes a plurality of magnets fixed to an inner surface of the hub that are configured to interact with a stator of the motor to rotate rotor. The rotor also includes redial spokes that extend from the hub and provide structural support to the rotor. The rotor may also include a hoop, which provides balance for rotor during operation of motor and may include an integrated fan that provides cooling to various components of the motor.

20 Claims, 4 Drawing Sheets

(56) References Cited

U.S. PATENT DOCUMENTS

| | | | | |
|---|---|---|---|---|
| 5,898,990 | A * | 5/1999 | Henry | H02K 15/03 29/598 |
| 6,847,145 | B2 | 1/2005 | Franco et al. | |
| 6,900,558 | B1 * | 5/2005 | Jung | H02K 1/34 310/15 |
| 8,240,286 | B2 | 8/2012 | Li et al. | |
| 9,802,698 | B2 | 10/2017 | Capelle et al. | |
| 10,822,101 | B2 | 11/2020 | Murrow et al. | |
| 11,691,750 | B1 * | 7/2023 | Verna | B64C 29/0025 244/6 |
| 2002/0101126 | A1 * | 8/2002 | Crapo | H02K 29/03 310/156.01 |
| 2006/0197394 | A1 * | 9/2006 | Applegate | F04D 25/066 310/156.08 |
| 2007/0080597 | A1 * | 4/2007 | Suzuki | H02K 1/2733 310/68 B |
| 2015/0222151 | A1 * | 8/2015 | Semken | H02K 1/28 29/452 |
| 2016/0238011 | A1 * | 8/2016 | Lambert | H02K 15/14 |
| 2017/0201141 | A1 * | 7/2017 | Rollins | F28C 1/00 |
| 2018/0065739 | A1 * | 3/2018 | Vondrell | B64D 27/24 |
| 2019/0074739 | A1 * | 3/2019 | Brookes | H02K 15/03 |
| 2019/0199151 | A1 * | 6/2019 | Loder | C25D 5/617 |
| 2019/0300193 | A1 | 10/2019 | Riedel | |
| 2020/0115043 | A1 | 4/2020 | Ljung | |
| 2020/0244120 | A1 * | 7/2020 | Gutjahr | H02K 21/14 |
| 2020/0339254 | A1 | 10/2020 | Davis et al. | |
| 2020/0354053 | A1 | 11/2020 | Waide et al. | |
| 2020/0381984 | A1 * | 12/2020 | Sercombe | H02P 27/08 |
| 2023/0202667 | A1 * | 6/2023 | Verna | B64D 33/08 244/6 |

FOREIGN PATENT DOCUMENTS

| | | | | |
|---|---|---|---|---|
| WO | WO-9718613 | A1 * | 5/1997 | H02K 1/278 |
| WO | WO-2022017721 | A1 * | 1/2022 | |

OTHER PUBLICATIONS

Cho et al., machine translation of kr101202476, Nov. 2012 (Year: 2012).*

* cited by examiner

ROTOR FOR AN ELECTRIC AIRCRAFT MOTOR COMPRISING A PLURALITY OF MAGNETS

FIELD OF THE INVENTION

The present invention generally relates to the field of aircraft. In particular, the present invention is directed to a rotor for an electric aircraft motor.

BACKGROUND

In electric multi-propulsion systems, such as electric vertical take-off and landing (eVTOL) aircraft, the propulsors are constrained by contemporary motor configurations. Design and assembly of the propulsor units include features that limit rotor configurations of electric aircrafts.

SUMMARY OF THE DISCLOSURE

In an aspect, an exemplary rotor for an electric aircraft, the rotor includes a hub comprising a lumen, which is configured to receive a rotor shaft, at least a spoke radially extending from the hub, a hoop concentric to the hub and connected to the at least a spoke, a plurality of magnets fixedly attached to an outer surface of the hoop and configured to interact with a stator to provide a rotational speed of the rotor, and an integrated radial fan configured to dissipate heat upon rotation of the rotor.

In another aspect, a motor for an electric aircraft includes a rotor shaft fixedly attached to a propulsor of an electric aircraft, a stator concentrically positioned relative to a rotor, wherein the stator provides an adaptable magnetic field, and a rotor for an electric aircraft, the rotor including a hub comprising a lumen, which is configured to receive the rotor shaft, at least a spoke radially extending from the hub, a hoop concentric to the hub and connected to the at least a spoke, a plurality of magnets fixedly attached to an outer surface of the hoop and configured to interact with the adaptable magnetic field of the stator to provide a rotational speed of the rotor, and an integrated radial fan configured to dissipate heat upon rotation of the rotor.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a rotor for an electric aircraft motor, such as the motor of a lift propulsor. The rotor includes a hoop having a plurality of magnets disposed on an outer surface of the hoop, where the plurality of magnets interact with a stator, such as windings of stator, to rotate rotor relative to the motor unit. The rotor configuration presented in this disclosure includes cooling capabilities and manufacturing time reduction.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1A:
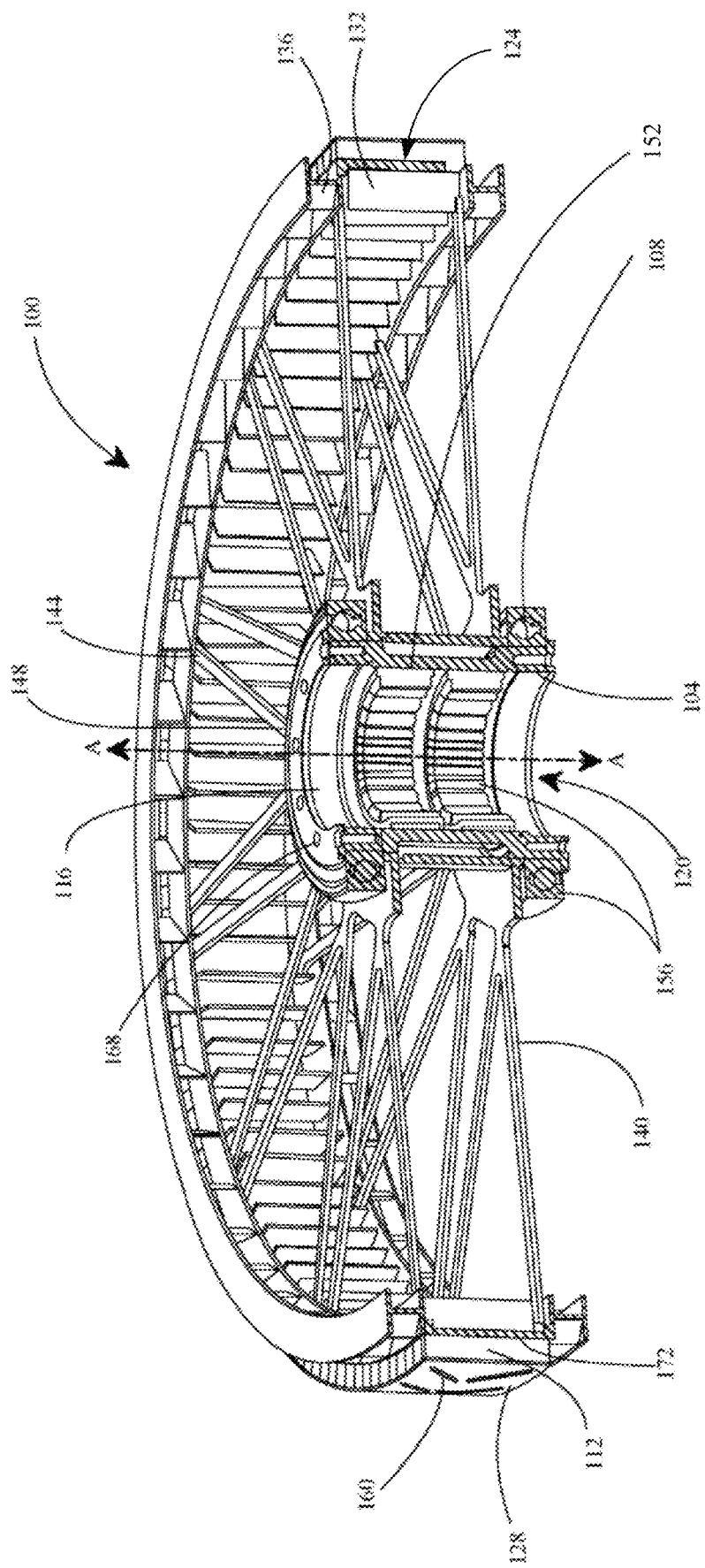
FIGS. 1A and 1B are illustrations showing cross-sectional views of an exemplary embodiment of a rotor for an electric aircraft motor in one or more aspects of the present disclosure.
Figure 1B:
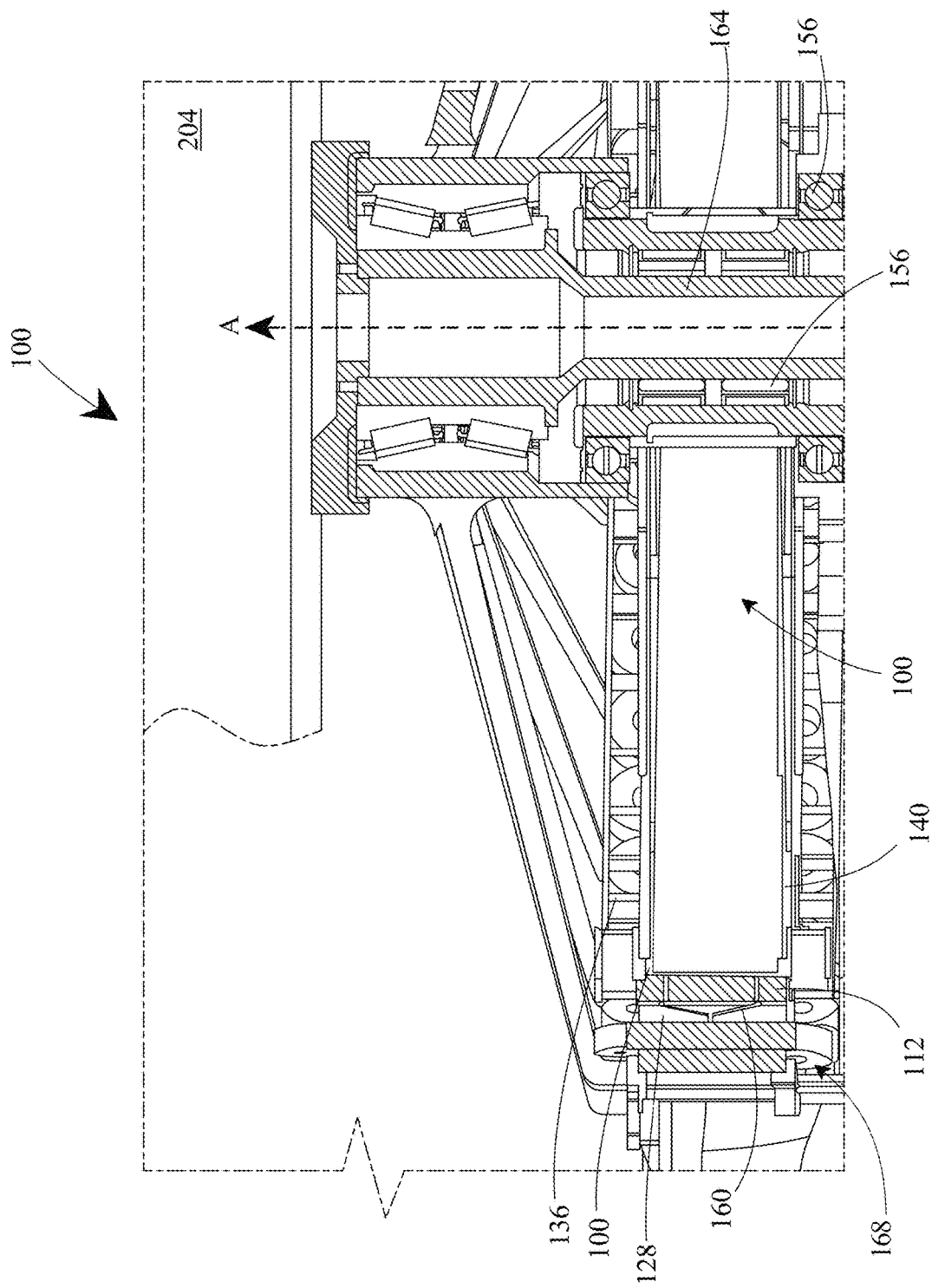

Referring now to FIGS. 1A and 1B, cross-sectional views of an exemplary embodiment of a rotor 100 of a motor of an electric aircraft are shown in accordance with one or more embodiments of the present disclosure. In one or more embodiments, motor may include a lift motor of a propulsor, as discussed further in this disclosure in FIG. 3. In one or more embodiments, rotor 100 includes a hub 108. Hub 108 may be a tubular structure. In one or more embodiments, inner surface 116 may define a lumen 120. Lumen 120 may be a longitudinal cavity that receives a rotor shaft 164. Shaft 164 may be disposed within lumen 120 of hub 108 so that rotor 100 may rotate and simultaneously rotate shaft 164 which in turn rotates a propulsor. As used in this disclosure, a "lumen" is a central cavity, for example a tubular or cylindrical bore.

In one or more embodiments, hub 108 may comprise an inner hub 104 and an outer hub 152. In one or more embodiments, outer hub 152 may be attached to a proximal end 148 of spokes 140 of rotor 100, as discussed further below. In one or more embodiments, inner hub 104 may be secured to outer hub 152 using a locking mechanism. A locking mechanism may be configured to removably attach sprag 156 to hub 108. A locking mechanism may include a bolted joint, dowels, key, spline, and the like. In one or more embodiments, the inner hub may include a sprag clutch 156, as discussed in more detail below.

In one or more embodiments, rotor 100 includes a sprag 156. Sprag 156 may be disposed within inner hub 104. For example, and without limitation, sprag 156 may be attached to an inner surface 116 of inner hub 104. Sprag 156 may engage a rotor shaft (not shown) which allow for the rotational movement of rotor to be translated into a mechanical movement of, for example, a propulsor. Sprag 156 may include a sprag clutch. In one or more embodiments, sprag 156 may have a cage design, so that the sprags are less likely to lay down due to centrifugal force experienced when rotor 100 is spinning. In one or more embodiments, sprag clutch 156 may include a maximum eccentricity of 90 microns.

With continued reference to FIGS. 1A and 1B, rotor 100 includes a hoop 124 concentrically positioned about hub 108. Hoop 124 may share a central axis A with hub 108. In one or more embodiments, hoop 124 includes magnets 112, which are positioned along an outer circumference of hoop 124 and attached to an outer surface of hoop 124. In one or more embodiments, a current may flow through a plurality of windings of a stator 168 that then results in the generation of electrically-induced magnetic fields that interact with magnets 112 to rotate rotor 100 about central axis A. During operation, rotor 100 may rotate axially about central axis A while stator 168 remains still, thus, rotor 100 is rotatable relative to stator 168.

In one or more embodiments, magnets 112 of hoop 124 may be permanent magnets fixed to outer surface 172 of the hoop 124. Magnets 112 may be arranged concentrically to a central axis A of rotor 100. Thus, magnets 112 may be arranged in a ring along the outer circumference of hoop 124, which is defined by outer surface 172 of hoop 124. Magnets 112 may be arranged in a single ring or may be arranged in a plurality of rings along outer surface 172. Each magnet 112 may be positioned adjacent to another magnet 112 along convex outer surface so that stator 168 is continuously interacting with a magnet 112 to produce a rotation of rotor 100. In one or more embodiments, hub 108 and hoop 124 may be made from various materials, such as, for example, steel.

In one or more embodiments, magnets 112 may include a magnet array. In non-limiting embodiments, a magnet array may include a Halbach array. A Halbach array is a special arrangement of permanent magnets that augments the magnetic field on one side of the array while canceling the field to near zero on the other side of the array. In general, the Halbach array is achieved by having a spatially rotating pattern of magnetization where the poles of successive magnets are not necessarily aligned and differ from one to the next. Orientations of magnetic poles may be repeated in patterns or in successive rows, columns, and arrangements. An array, for the purpose of this disclosure is a set, arrangement, or sequence of items, in this case permanent magnets. The rotating pattern of permanent magnets can be continued indefinitely and have the same effect, and may be arranged in rows, columns, or radially, in a non-limiting illustrative embodiment. One of ordinary skill in the art would appreciate that the area that the Halbach array augments the magnetic field of may be configurable or adjustable.

In one or more embodiments, hoop 124 may include cooling features, such as, for example, an integrated radial fan 132 or an integrated axial fan 136. A radial fan may comprise cooling fins positioned on an upper surface of hoop 124 and provide cooling to a stator when rotor 100 is rotating about central axis A. An axial fan may include fins positioned along an inner surface of hoop 124 and provide cooling to motor. Radial and axial fans may be consistent with motor cooling fans provided in the disclosure U.S. application Ser. No. 17/563,498, filed on Dec. 28, 2021, and titled "AN ELECTRIC AIRCRAFT LIFT MOTOR WITH AIR COOLING", which is incorporated in this disclosure in its entirety by reference. For example, a fan may be a centrifugal fan. As used in this disclosure, a "centrifugal fan" is a mechanical device for moving air in a direction at an angle to the incoming air. For example, a centrifugal fan may direct air radially in a direction substantially perpendicular to the incoming air. Directed air could be caused to circulate through an air gap due to the Venturi effect. At least a blade may be configured to direct air radially away from an axis of rotation. At least a blade may be one or more straight radial blades each comprising a flat surface extending radially such that the flat surface is perpendicular to an axis of rotation. According to the direction of rotation, the at least a blade may slope outward toward an inner cylindrical surface of the stator. At least a blade may include a plurality of blades similarly positioned and spaced from each other so each of plurality of blades is angled outward toward an inner cylindrical surface of the stator to direct air toward the stator. At least a blade may be backward-curved blades that curve against the direction of the rotation of a fan. At least a blade may be forward-curved blades that curve in the direction of the rotation of a fan. At least a blade may be on one or more axials ends of a rotor. As used in this disclosure, "on" may include directly on and indirectly attached to such that there are one or more intervening elements. In one or more embodiments, hoop 124 may include various types of materials, such as for example, titanium, steel, and the like. In one or more embodiments, hoop 124 may include a retention sleeve 128, which is configured to dissipate heat from rotor and/or motor. Retention sleeve 128 may be a strip and/or band of a solid material or an aggregation of individual materials that runs along an outer circumference of hoop 124. Retention sleeve 128 may be made from various materials, such as stainless steel, titanium, carbon, carbon-composite, and the like. Retention sleeve may provide stability for rotor 100 and prevent magnets 112 from lifting from outer surface 172 of hoop 124 by centrifugal forces. Retention sleeve 128 may include slits of various shapes and patterns to provide venting for temperature management purposes. For, example, slits 142 allow for air to pass through retention sleeve 128, allowing air to circulate through rotor 100 when rotor 100 is spinning about central axis A.

In one or more embodiments, rotor 100 includes a plurality of spokes 140, that radiate from hub 108 to connect hub 108 and hoop 124. Spokes 140 may extend radially outward from hub 108 to hoop 124. Spokes 140 may be positioned in various arrangement to provide structural support to rotor 100. In one or more embodiments, spokes 140 may be made from various materials, such as steel, titanium and the like. In some embodiments, hoop 124 and spokes 140 may be separate components that may be assembly together. In other embodiments, hoop 124 and spokes 140 may be a monolithic structure. For example, in some cases spokes may include a single element, such as without limitation a disc. Disc may be solid or may include holes 168. In one or more embodiments, a distal end 144 of each spoke may terminate at and/or be attached to hoop 124, and a proximal end 148 of each spoke 140 may be attached to hub 108.

Figure 2:
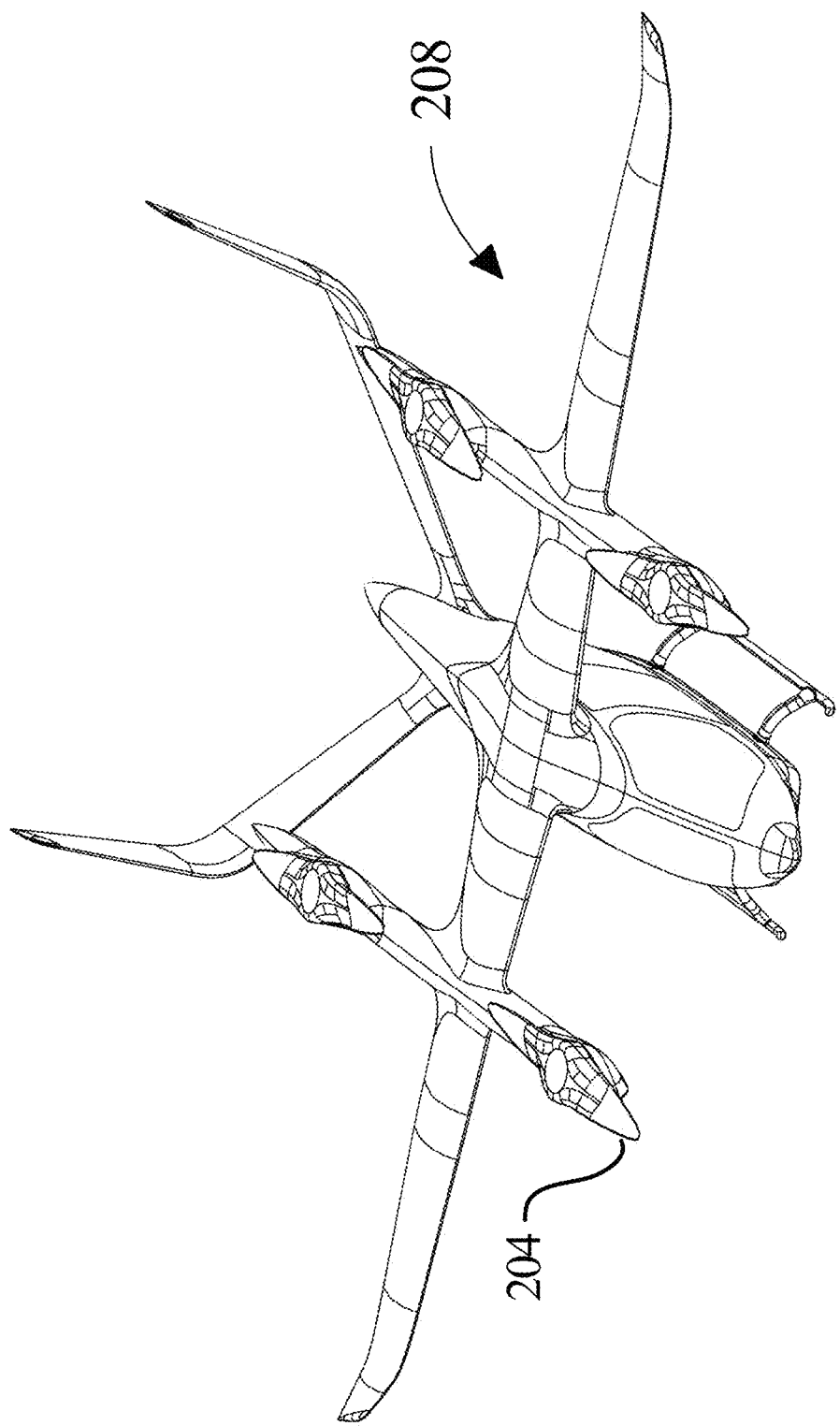
FIG. 2 is an illustration of an exemplary aircraft in one or more aspects of the present disclosure.

Referring now to FIG. 2, an exemplary embodiment of an electric aircraft 208 with a propulsor 204 is illustrated in accordance with one or more embodiments of the present disclosure. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 116 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eVTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, filed on Dec. 4, 2019, and entitled "AN INTEGRATED ELECTRIC PROPULSION ASSEMBLY," the entirety of which is incorporated herein by reference.

As used in this disclosure, a vertical take-off and landing (eVTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 208, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where an aircraft is capable of flight using wings and/or foils that generate lift caused by the aircraft's forward airspeed and the shape of the wings and/or foils, such as airplane-style flight.

In one or more embodiments, aircraft 208 may include motor, which may be mounted on a structural feature of an aircraft. Design of motor may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge. Further, a structural feature may include a component of aircraft 208. For example, and without limitation structural feature may be any portion of a vehicle incorporating motor, including any vehicle as described below. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 204. Persons skilled in the art, upon reviewing the entirety of this disclosure, will be aware of various materials, combinations of materials, and/or constructions techniques.

Still referring to FIG. 2, rotor 100 may be used for a plurality of various flight components of electric aircraft 208, such as a propulsor 204. For the purposes of this disclosure, a "propulsor" is a component or device used to propel a craft by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel, and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment, propulsor may include a rotating power-driven hub, to which are attached several radial airfoil-section blades such that the whole assembly rotates about a longitudinal axis. In one or more embodiments, rotor 100 may be used in a motor of a lift propulsor, which is further described in this disclosure with reference to FIG. 3. In one or more exemplary embodiments, propulsor 204 may include a vertical propulsor or a forward propulsor. A forward propulsor may include a propulsor configured to propel aircraft 208 in a forward direction. A vertical propulsor may include a propulsor configured to propel aircraft 208 in an upward direction. One of ordinary skill in the art would understand upward to comprise the imaginary axis protruding from the earth at a normal angle, configured to be normal to any tangent plane to a point on a sphere (i.e. skyward). In an embodiment, vertical propulsor can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight.

In an embodiment, propulsor 204 may include a propeller, a blade, or the like. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of a propeller may, for example, be fixed, manually variable to a few set positions, automatically variable (e.g. a "constant-speed" type), or any combination thereof. In an exemplary embodiment, propellers for an aircraft may be designed to be fixed to their hub at an angle similar to the thread on a screw makes an angle to the shaft; this angle may be referred to as a pitch or pitch angle which will determine the speed of the forward movement as the blade rotates.

In an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Still referring to FIG. 2, a propulsor may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 208 forward with an equal amount of force. In an embodiment, and without limitation, the more air forced behind aircraft, the greater the thrust force with which aircraft 208 is pushed horizontally will be. In another embodiment, and without limitation, forward thrust may force aircraft 208 through the medium of relative air. Additionally or alternatively, plurality of propulsor may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Figure 3:
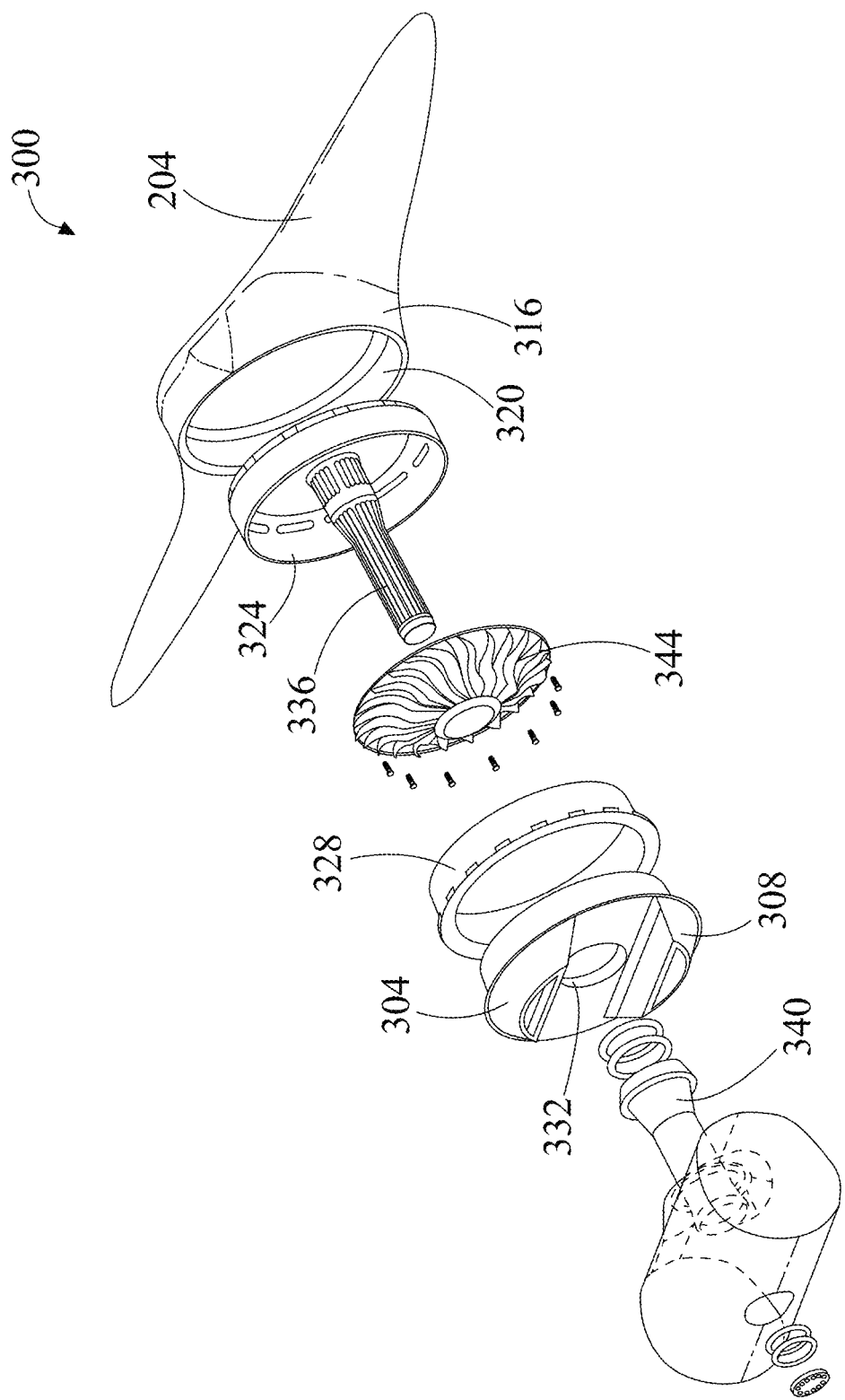
FIG. 3 is an illustration showing an exploded view of an exemplary embodiment of an electric motor in a propulsion assembly in one or more aspects of the present disclosure.

In one or more embodiments, propulsor 204 includes a motor 304 (shown also in FIG. 3). Motor 304 may include, without limitation, any electric motor, where an electric motor is a device that converts electrical energy into mechanical energy, for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and the like.

Referring now to FIG. 3, an embodiment of an integrated electric propulsion assembly 300 is illustrated. Integrated electric propulsion assembly 300 includes at least a stator 304. Stator 304, as used herein, is a stationary component of a motor and/or motor assembly. In an embodiment, stator 304 includes at least a first magnetic element 308. As used herein, first magnetic element 308 is an element that generates a magnetic field. For example, first magnetic element 308 may include one or more magnets which may be assembled in rows along a structural casing component. Further, first magnetic element 308 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. A first magnetic element 308 may act to produce or generate a magnetic field to cause other magnetic elements to rotate, as described in further detail below. Stator 304 may include a frame to house components including at least a first magnetic element 308, as well as one or more other elements or components as described in further detail below. In an embodiment, a magnetic field can be generated by a first magnetic element 308 and can comprise a variable magnetic field. In embodiments, a variable magnetic field may be achieved by use of an inverter, a controller, or the like. In an embodiment, stator 304 may have an inner and outer cylindrical surface; a plurality of magnetic poles may extend outward from the outer cylindrical surface of the stator. In an embodiment, stator 304 may include an annular stator, wherein the stator is ring-shaped. In an embodiment, stator 304 is incorporated into a DC motor where stator 304 is fixed and functions to supply the magnetic fields where a corresponding rotor, as described in further detail below, rotates.

Still referring to FIG. 3, integrated electric propulsion assembly 300 includes propulsor 204. In embodiments, propulsor 204 can include an integrated rotor. As used herein, a rotor is a portion of an electric motor that rotates with respect to a stator of the electric motor, such as stator 304. A propulsor, as used herein, is a component or device used to propel a craft by exerting force on a fluid medium, which may include a gaseous medium such as air or a liquid medium such as water. Propulsor 204 may be any device or component that consumes electrical power on demand to propel an aircraft or other vehicle while on ground and/or in flight. Propulsor 204 may include one or more propulsive devices. In an embodiment, propulsor 204 can include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like.

In an embodiment, propulsor 204 may include at least a blade. As another non-limiting example, a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as propulsor 204. In an embodiment, when a propulsor twists and pulls air behind it, it will, at the same time, push the aircraft forward with an equal amount of force. The more air pulled behind the aircraft, the more the aircraft is pushed forward.

In an embodiment, thrust element may include a helicopter rotor incorporated into propulsor 204. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

Continuing to refer to FIG. 3, propulsor 204 can include a hub 316 rotatably mounted to stator 304. Rotatably mounted, as described herein, is functionally secured in a manner to allow rotation. Hub 316 is a structure which allows for the mechanically connected of components of the integrated rotor assembly. In an embodiment, hub 316 can be mechanically connected to propellers or blades. In an embodiment, hub 316 may be cylindrical in shape such that it may be mechanically joined to other components of the rotor assembly. Hub 316 may be constructed of any suitable material or combination of materials, including without limitation metal such as aluminum, titanium, steel, or the like, polymer materials or composites, fiberglass, carbon fiber, wood, or any other suitable material. Hub 316 may move in a rotational manner driven by interaction between stator and components in the rotor assembly. Persons skilled in the art, upon reviewing the entirety of this disclosure, will be aware of various structures that may be used as or included as hub 316, as used and described herein.

Still referring to FIG. 3, propulsor 204 can include a second magnetic element 320, which may include one or more further magnetic elements. Second magnetic element 320 generates a magnetic field designed to interact with first magnetic element 308. Second magnetic element 320 may be designed with a material such that the magnetic poles of at least a second magnetic element are oriented in an opposite direction from first magnetic element 308. In an embodiment, second magnetic element 320 may be affixed to hub 316. Affixed, as described herein, is the attachment, fastening, connection, and the like, of one component to another component. For example, and without limitation, affixed may include bonding the second magnetic element 320 to hub 316, such as through hardware assembly, spot welding, riveting, brazing, soldering, glue, and the like. Second magnetic element 320 may include any magnetic element suitable for use as a first magnetic element 308. For instance, and without limitation, second magnetic element may include a permanent magnet and/or an electromagnet. Second magnetic element 320 may include magnetic poles oriented in a second direction opposite of the orientation of the poles of first magnetic element 308. In an embodiment, electric propulsion assembly 300 includes a motor assembly incorporating stator 304 with a first magnet element 308 and second magnetic element 320. First magnetic element 308 includes magnetic poles oriented in a first direction, and second magnetic element 320 includes a plurality of magnetic poles oriented in the opposite direction than the plurality of magnetic poles in the first magnetic element 308.

Continuing to refer to FIG. 3, second magnetic element 320 may include a plurality of magnets attached to or integrated in hub 316. In an embodiment, hub 316 may incorporate structural elements of the rotor assembly of the motor assembly. As a non-limiting example hub 316 may include a motor inner magnet carrier 324 and motor outer magnet carrier 328 incorporated into the hub 316 structure. In an embodiment motor inner magnet carrier 324 and motor outer magnet carrier 328 may be cylindrical in shape. In an embodiment, motor inner magnet carrier 324 and motor out magnet carrier 316 may be any shape that would allow for a fit with the other components of the rotor assembly. In an embodiment, hub 316 may be short and wide in shape to reduce the profile height of the rotating assembly of electric propulsion assembly 300. Reducing the profile assembly height may have the advantage of reducing drag force on the external components. In an embodiment, hub 316 may also be cylindrical in shape so that fitment of the components in the rotor assembly are structurally rigid while leaving hub 316 free to rotate about stator.

In an embodiment, motor outer magnet carrier 328 may have a slightly larger diameter than motor inner magnet carrier 324, or vice-versa. First magnetic element 308 may be a productive element, defined herein as an element that produces a varying magnetic field. Productive elements will produce magnetic field that will attract and other magnetic elements, including a receptive element. Second magnetic element may be a productive or receptive element. A receptive element will react due to the magnetic field of a first magnetic element 308. In an embodiment, first magnetic element 308 produces a magnetic field according to magnetic poles of first magnetic element 308 oriented in a first direction. Second magnetic element 320 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 316 and rotor assembly may both be cylindrical in shape where rotor may have a slightly smaller circumference than hub 316 to allow the joining of both structures. Coupling of hub 316 to stator 304 may be accomplished via a surface modification of either hub 316, stator 304 or both to form a locking mechanism. Coupling may be accomplished using additional nuts, bolts, and/or other fastening apparatuses. In an embodiment, an integrated rotor assembly as described above reduces profile drag in forward flight for an electric aircraft. Profile drag may be caused by a number of external forces that the aircraft is subjected to. By incorporating a propulsor 204 into hub 316, a profile of integrated electric propulsion assembly 300 may be reduced, resulting in a reduced profile drag, as noted above. In an embodiment, the rotor, which includes motor inner magnet carrier 324, motor outer magnet carrier 328, propulsor 204 is incorporated into hub 316 to become one integrated unit. In an embodiment, inner motor magnet carrier 312 rotates in response to a magnetic field. The rotation causes hub 316 to rotate. This unit can be inserted into integrated electric propulsion assembly 300 as one unit. This enables ease of installation, maintenance, and removal.

Still referring to FIG. 3, stator 304 may include a through-hole 332. Through-hole 332 may provide an opening for a component to be inserted through to aid in attaching propulsor with integrated rotor to stator. In an embodiment, through-hole 332 may have a round or cylindrical shape and be located at a rotational axis of stator 304. Hub 316 may be mounted to stator 304 by means of a shaft 336 rotatably inserted though through hole 332. Through-hole 332 may have a diameter that is slightly larger than a diameter of shaft 336 to allow shaft 336 to fit through through-hole 332 to connect stator 304 to hub 316. Shaft 336 may rotate in response to rotation of propulsor 204.

Still referring to FIG. 3, integrated electric propulsion assembly 300 may include a bearing cartridge 340. Bearing cartridge 340 may include a bore. Shaft 336 may be inserted through the bore of bearing cartridge 340. Bearing cartridge 340 may be attached to a structural element of a vehicle. Bearing cartridge 340 functions to support the rotor and to transfer the loads from the motor. Loads may include, without limitation, weight, power, magnetic pull, pitch errors, out of balance situations, and the like. A bearing cartridge 340 may include a bore. A bearing cartridge 340 may include a smooth metal ball or roller that rolls against a smooth inner and outer metal surface. The rollers or balls take the load, allowing the device to spin. A bearing may include, without limitation, a ball bearing, a straight roller bearing, a tapered roller bearing or the like. A bearing cartridge 340 may be subject to a load which may include, without limitation, a radial or a thrust load. Depending on the location of bearing cartridge 340 in the assembly, it may see all of a radial or thrust load or a combination of both. In an embodiment, bearing cartridge 340 may join integrated electric propulsion assembly 300 to a structure feature. A bearing cartridge 340 may function to minimize the structural impact from the transfer of bearing loads during flight and/or to increase energy efficiency and power of propulsor. A bearing cartridge 340 may include a shaft and collar arrangement, wherein a shaft affixed into a collar assembly. A bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are balls or rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 340 may act to keep a propulsor 204 and components intact during flight by allowing integrated electric propulsion assembly 300 to rotate freely while resisting loads such as an axial force. In an embodiment, bearing cartridge 340 includes a roller bearing incorporated into the bore. a roller bearing is in contact with propulsor shaft 336. Stator 304 is mechanically coupled to inverter housing 340. Mechanically coupled may include a mechanical fastening, without limitation, such as nuts, bolts or other fastening device. Mechanically coupled may include welding or casting or the like. Inverter housing contains a bore which allows insertion by propulsor shaft 336 into bearing cartridge 340.

Still referring to FIG. 3, electric propulsion assembly 300 may include a motor assembly incorporating a rotating assembly and a stationary assembly. Hub 316, motor inner magnet carrier 324 and propulsor shaft 336 may be incorporated into the rotor assembly of electric propulsion assembly 300 which make up rotating parts of electric motor, moving between the stator poles and transmitting the motor power. As one integrated part, the rotor assembly may be inserted and removed in one piece. Stator 304 may be incorporated into the stationary part of the motor assembly. Stator and rotor may combine to form an electric motor. In embodiment, an electric motor may, for instance, incorporate coils of wire which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example, and without limitation, a first magnetic element 308 in electric propulsion assembly 300 may include an active magnet. For instance, and without limitation, a second magnetic element may include a passive magnet, a magnet that reacts to a magnetic force generated by a first magnetic element 308. In an embodiment, a first magnet positioned around the rotor assembly, may generate magnetic fields to affect the position of the rotor relative to the stator 304. A controller may have an ability to adjust electricity originating from a power supply and, thereby, the magnetic forces generated, to ensure stable rotation of the rotor, independent of the forces induced by the machinery process. Electric propulsion assembly 300 may include an impeller 344 coupled with the shaft 336. An impeller, as described herein, is a rotor used to increase or decrease the pressure and flow of a fluid and/or air. Impeller 344 may function to provide cooling to electric propulsion assembly 300. Impeller 344 may include varying blade configurations, such as radial blades, non-radial blades, semi-circular blades and airfoil blades. Impeller 344 may further include single and/or double-sided configurations. Impeller 344 is described in further detail below.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A rotor for an electrical aircraft the rotor comprising:
    a hub defining a lumen, configured to receive a rotor shaft;
    a hoop coupled to and concentric with the hub;
    a plurality of magnets fixedly attached to an outer circumferential surface of the hoop and configured to interact with a stator;
    a structural element extending between the hub and the hoop, the structural element defining at least one opening;
    a first radial fan integrally formed at a first axial end portion of the hoop, wherein the first radial fan includes a first plurality of cooling fins formed on the first axial end portion of the hoop, positioned corresponding to a first portion of a stator winding so as to direct air radially outward across the first portion of the stator winding; and an axial fan coupled to the rotor and configured to direct air axially through the rotor, the axial fan including a plurality of axial fins disposed on an inner circumferential surface of the hoop.

2. The rotor of claim 1, wherein the hub comprises an inner hub and an outer hub, and a sprag is disposed within at least one of the inner hub or the outer hub.

3. The rotor of claim 2, wherein the sprag comprises a cage sprag.

4. The rotor of claim 1, further comprising a sprag, wherein the sprag further comprises a locking mechanism configured to removably attach the sprag to the hub.

5. The rotor of claim 4, wherein the sprag comprises a maximum eccentricity of 90 microns.

6. The rotor of claim 1, wherein the hub comprises an inner hub and an outer hub, and the inner hub and the outer hub are removably connected by a locking mechanism.

7. The rotor of claim 6, wherein the locking mechanism comprises a spline of metal.

8. The rotor of claim 1, wherein the structural element includes a plurality of spokes extending radially outward, from the hub to the hoop.

9. The rotor of claim 1, wherein the hub includes holes that allow for the rotor to be removably attached to at least one of the rotor shaft or a propulsor base.

10. The rotor of claim 1, wherein each of the plurality of magnets is fixedly attached to the outer circumferential surface of the hoop using an adhesive.

11. The rotor of claim 1, wherein at least one of the hoop or the structural element is composed of titanium.

12. The rotor of claim 1, wherein the rotor is configured to be installed in an electric motor of an electric vertical take-off and landing (eVTOL) aircraft.

13. The rotor of claim 1, wherein the structural element comprises a plurality of spokes coupling the hoop to the hub, wherein the plurality of spokes includes:

a first plurality of spokes extending radially between the hub and the hoop; and a second plurality of spokes extending radially between the hub and the hoop, wherein an arrangement of the second plurality of spokes corresponds to an arrangement of the first plurality of spokes, and wherein the arrangement of the second plurality of spokes is offset in location from the arrangement of the first plurality of spokes along a central axis of rotation of the rotor, and is aligned with and spaced from the first plurality of spokes along the central axis of rotation.

14. The rotor of claim 1, wherein the rotor is included in at least one propulsion motor of the electric aircraft, wherein the at least one propulsion motor is air cooled and does not require liquid cooling.

15. The rotor of claim 14, wherein the at least one propulsion motor includes at least two propulsion motors configured as lift motors for an electric vertical take-off and landing (eVTOL) aircraft.

16. The rotor of claim 1, further comprising a second radial fan integrally formed at a second axial end portion of the hoop, wherein the second radial fan includes a second plurality of cooling fins formed on the second axial end portion of the hoop, positioned corresponding to a second portion of the stator winding so as to direct air radially outward across the second portion of the stator winding.

17. A motor for an electric aircraft, the motor comprising:
a rotor shaft fixedly attached to a propulsor;
the stator concentrically positioned relative to the rotor shaft, wherein the stator includes a stator winding and provides an adaptable magnetic field; and
the rotor comprising:
a hub defining a lumen, configured to receive the rotor shaft;
a hoop concentric with and coupled to the hub;
a structural element extending radially between the hub and the hoop, the structural element including at least one opening;
a plurality of magnets fixedly attached to an outer surface of the hoop and configured to magnetically couple with the stator;
a first radial fan including a plurality of cooling fins integrally formed at a first axial end portion of the hoop, wherein the first radial fan is configured and dimensioned to be located adjacent a first portion of a stator winding to direct air radially outward across the first portion of the stator winding; and
an axial fan coupled to the rotor and configured to direct air axially through the rotor, the axial fan includes a plurality of axial fins disposed on an inner circumferential surface of the hoop.

18. The motor of claim 17, wherein the motor is configured to be installed in an electric vertical take-off and landing (eVTOL) aircraft.

19. The motor of claim 17, wherein the hub comprises an inner hub and an outer hub, and a sprag is disposed within at least one of the inner hub or the outer hub.

20. The motor of claim 19, wherein the sprag comprises a cage sprag.

* * * * *